Patented Oct. 15, 1935

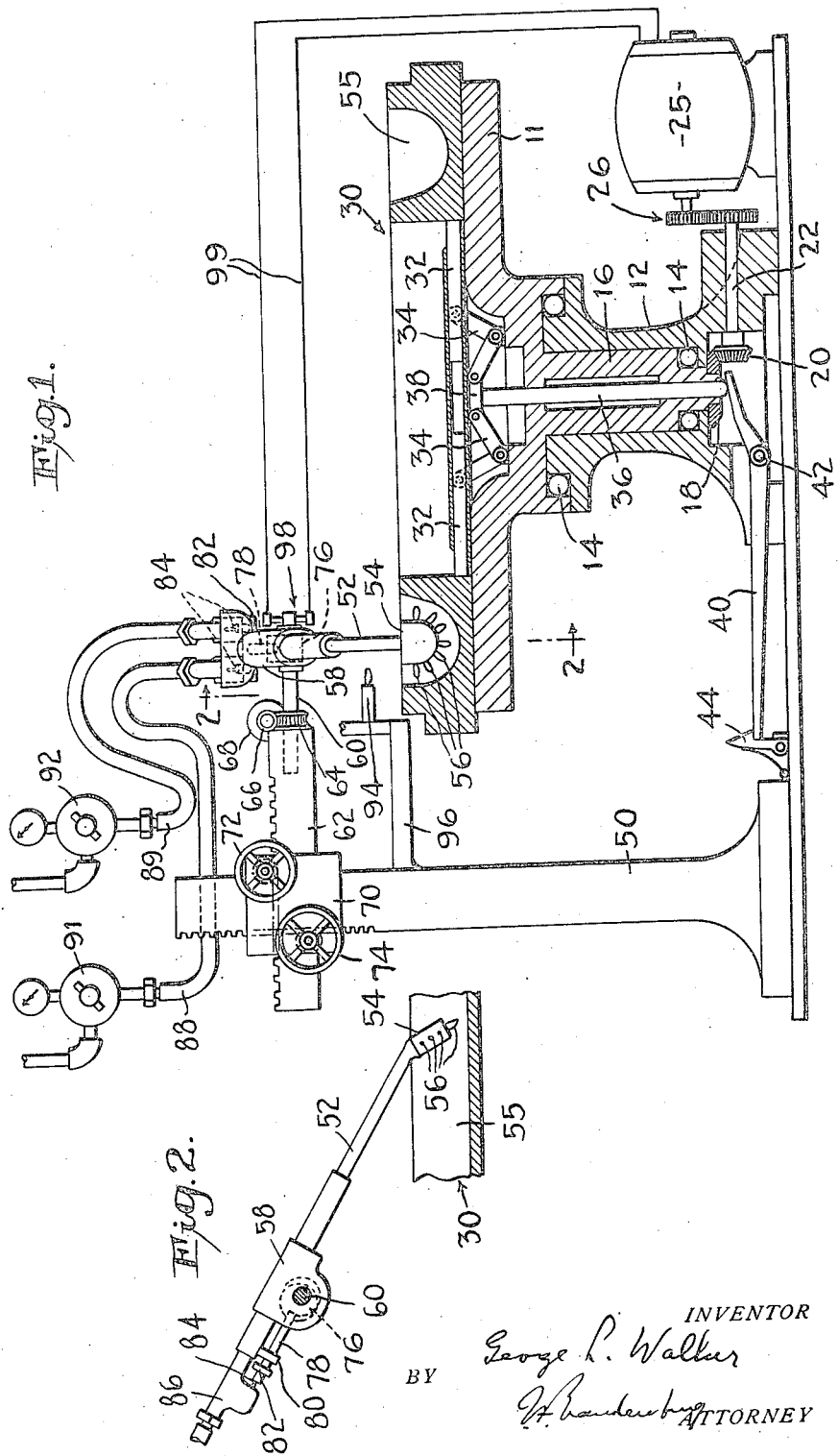

2,017,423

UNITED STATES PATENT OFFICE 2,017,423

APPARATUS FOR CLEANING TIRE MOLDS

George L. Walker, Jersey City, N. J., assignor to Air Reduction Company, Incorporated, New York, N. Y., a corporation of New York Application August 17, 1933, Serial No. 685,521

10 Claims. (Cl. 263—5)

This invention relates to apparatus for cleaning tire molds which are used in curing automobile tires.

These molds have a recess which is made to the exact contour of a finished tire. An uncured tire is placed in the recess and a complementary mold is put over the top of the tire. The uncured tire contains a steam bag, and when the tire is enclosed by the molds steam is admitted to the bag to expand the rubber outward against the molds to give it the contour of the molds.

The molds are placed in a heater for a period of time. The uncured tire is first softened by the heat so that it becomes very plastic. Later the action of the heat causes the rubber to become harder, ordinarily referred to as becoming "cured". After the tires are cured, the molds are removed from the heaters and the tires are peeled from the molds.

In order to prevent the tires from sticking to the molds, the molds are frequently given a thin coating of some material, such as finely ground cork, sodium hypo-sulphate, talc, or tan-bark soap. After a number of tires have been cured, the mold acquires a heavy deposit of this material, which imparts to the finished tire the appearance of being "worn". The heavy deposit sometimes causes black or discolored spots, which detract from the smooth surface of the newly vulcanized rubber. When the worn or spotty appearance of the tires becomes excessive, the coating must be removed from the mold.

Circular wire brushes, driven by electric motors, have been used for removing the coating from tire molds. This method is expensive because it is slow and uses wire brushes which are expensive. It is not entirely satisfactory because entire removal of the coating is almost impossible by brushing.

The molds can be cleaned more easily and completely by an oxy-fuel torch which directs a flame jet against the coating. The flame must burn at a relatively high velocity. The oxygen-gas ratio may be neutral or somewhat oxidizing, depending upon the material used in coating the molds. When sodium hypo-sulphate is used the action of the torch is to expand the coating, causing it to flake off, and the flame and method must be adapted to the material so that the sodium hypo-sulphate will not melt and run back over the surface of the mold. When tan-bark soap and other carboniferous materials are used, the action of the flame is one of combustion, and a flame of high velocity is used, with a ratio, when the fuel is acetylene, of from 1.4 to 1.5 parts of oxygen to 1 part of acetylene. The excess oxygen not only gives the flame its greatest temperature but also provides the oxygen for the combustion of the coating. The high velocity of the gas accelerates the combustion.

It is an object of this invention to provide improved apparatus for cleaning tire molds with an oxy-fuel torch, and the invention comprises novel features and combinations of elements that make the cleaning of tire molds more economical and insure against burning or melting of the metal of the tire mold.

Another object of the invention is to provide a machine for cleaning tire molds with a power-driven turntable for revolving the tire mold, a torch supported for movement toward and from the tire mold, and automatic means for starting the turntable as the torch is moved toward the tire mold. The turntable is always stationary when the tire mold is being placed on it, and this automatic starting feature makes it impossible for an operator to lower the torch into the tire mold while it is stationary and damage the mold by permitting the flames to play on one place until the metal burns or melts. The invention includes the additional feature of automatic stopping of the turntable when the torch is withdrawn from the tire mold.

Another object of the invention is to provide a machine for cleaning tire molds with mechanism for causing relative movement of the torch and tire mold, and means for automatically closing the oxygen and fuel supply valves when the torch is moved away from the tire mold. This closing of the valves may reduce the flow of gas to the torch, but is preferably a complete closing so that the flame jets are extinguished every time the torch is withdrawn from the mold. The gas consumed by the torch is thus reduced to a minimum. Except for the insignificant requirements of a pilot light, no gas is burned when the torch is not in use, for example, during the time that tire molds are being removed from and placed on the machine.

Other objects, features and advantages of the invention will appear or be pointed out as the description proceeds.

In the accompanying drawing, forming a part hereof:

Fig. 1 is a diagrammatic side elevation, partly in section, of a tire mold cleaning apparatus embodying the invention; and Fig. 2 is a fragmentary sectional view on the line 2—2 of Fig. 1.

A turntable 11 is supported by a column 12 and turns on ball bearings 14. A spindle 16 connects the turntable with a bevel gear 18, which meshes with a bevel gear 20 secured to a drive shaft 22. Power is supplied to the drive shaft from a motor 25 through reduction gearing 26. This motor runs at a uniform speed.

A tire mold 30 rests on the turntable 11 and is centered on the turntable by sliding blocks 32 which are moved radially by bell-cranks 34. There are preferably four blocks 32, one every 90° around the turntable, and each block is connected to a separate bell-crank 34. All of the blocks 32 are moved at the same time and through the same distance by a common operating rod 36, which extends up through the spindle 16 and has a collar 38 at its upper end pivotally connected to all of the bell-cranks 34. A foot lever 40, supported by a bearing 42 in the column 12, raises and lowers the operating rod 36 to move the blocks 32 toward or from the axis of the turntable. The foot lever 40 is held in position to maintain the operating rod 36 raised and the blocks against the tire mold by a latch 44 which can be released to permit the operating rod 36 to move down.

A post 50 rests on the same base as the turntable and motor, and supports a torch 52. The torch has a tip 54 with a curved face for directing flame jets 56 toward the surface of the tire-receiving recess 55 of the mold and at effective angles to this surface.

The torch 52 is held in a bracket 58, which is free to turn on a supporting shaft 60. This shaft is carried by a block 62. A worm-wheel 64, secured to the shaft 60, is turned by a worm gear 66 connected with a hand-wheel 68. The worm gear 66 has a slow pitch so that the gearing for turning the shaft 60 is irreversible and holds the shaft in any set position.

The block 62 slides on a horizontal bearing in a frame 70, which is movable vertically on the post 50. The block 62 is moved with respect to the frame 70 by rack and pinion means operated by a hand-wheel 72 carried by the frame 70. Another hand-wheel 74 on the frame 70 operates rack and pinion mechanism for moving the frame 70 up or down on the post 50.

A cam 76 is keyed to the shaft 60 within the bracket 58. A push rod 78 slides through a bearing in the bracket 58 and another bearing in a lug 80 projecting from the torch 52. A cross-head 82 at the upper end of the push rod 78 contacts with stems 84 of oxygen and acetylene valves in a valve block 86 connected to the top of the torch 52. Oxygen and acetylene are supplied to the valve block 86 through hoses 88 and 89 connected to pressure regulators 91 and 92.

The cam 76 has a radial rise which comes against the push rod 78, as shown in Fig. 2, and prevents further movement of the torch 52 about the shaft 60. The hand-wheel 68 is turned to set the shaft 60 and cam 76 in position so that with the push rod 78 against the radial rise of the cam the torch tip 54 is at the desired angle with respect to the tire mold. Vertical and horizontal movement of the torch with respect to the tire mold is effected by turning the hand-wheels 72 and 74.

With the torch in the position shown in Fig. 2, the push rod 78 is in raised position and holds the valves in the valve block 86 open. After cleaning a tire mold the tip 54 is lifted out of the mold, the torch and the bracket 58 oscillating about the shaft 60 in a counter-clockwise direction in Fig. 2. This movement of the torch and bracket produces a relative movement of the cam 76 and push rod 78. The cam is shaped so that this movement permits the push rod to move away from the valve block 86, and springs behind the oxygen and acetylene valves close these valves. The supply of gases to the torch tip is thus automatically cut off whenever the tip is lifted out of the tire mold by rocking the torch about the shaft 60.

If the valves in the valve block 86 are designed to be opened by spring pressure and closed by displacement of the push rod 78 toward the valve block, the cam 76 must be shaped to cause this displacement when the torch tip is raised from the tire mold.

When the torch 52 is rocked about the shaft 60 to lower the tip 54 into the tire mold, the relative movement of the push rod 78 and cam 76 causes the oxygen and acetylene valves to again open and supply gases to the tip 54. A pilot burner 94 is supported by an arm 96 extending from the post 50. When the torch 52 is being rocked to bring the tip 54 into the mold, the tip passes close to the pilot burner just after the valves in the valve block 86 open and the gas jets are thus automatically ignited. Other kinds of pilot burners can be employed.

An electric switch 98 is connected to the shaft 60 and the torch 52 so that rocking movement of the torch on the shaft 60 causes the switch 98 to be opened and closed. The switch 98 is connected to conductors 99 in the circuit of the motor 25 and connected to the torch in such relation that it is closed by movement of the torch 52 into position for cleaning a tire mold, and opened when the tip is raised out of the tire mold. The movement of the torch thus controls the operation of the motor, so that the turntable starts automatically when the torch tip is moved into the mold, and stops automatically whenever the tip is lifted out of the mold by rocking the torch.

The operation of the invention is as follows:

With the operating rod 36 in a lowered position and the blocks 32 retracted toward the axis of the turntable 11, a tire mold 30 is placed on the turntable. When placing the mold on the turntable the torch 52 is in a position with the tip 54 substantially level with the shaft 60, or higher, so that it does not interfere with the placing of the tire mold. The switch 98 is open and the motor 25 and turntable 11 are stationary.

After the tire mold has been placed in a substantially central position on the turntable 11, the foot lever 40 is operated to raise the operating rod 36 and move the blocks 32 radially until they contact with the tire mold and center it exactly. The latch 44 holds the pedal end of the foot lever 40 in depressed position and maintains the blocks 32 against the tire mold so that it can not move out of proper position during the cleaning operation.

The tip 54 is then lowered into the tire mold by rocking the torch 52 on the shaft 60. This rocking movement of the torch with respect to the shaft 60 and cam 76 causes the push rod 78 to move so that the valves in the valve block 86 open and supply oxygen and acetylene to the torch tip. As the tip 54 passes the pilot burner 94, the jets of gas are ignited and are burning with steady flames by the time the tip reaches its final position in the tire mold.

This rocking movement of the torch when lowering the tip into the tire mold closes the switch 98 and starts the motor 25 so that the tire mold is revolving at a uniform speed when the tip moves into position to direct the flame jets against the mold. This automatic operation of the turntable motor makes it impossible for an operator, through carelessness or inadvertence, to injure a tire mold by playing the flame jets against one place for a prolonged period while the tire mold is stationary.

When the tire mold has made one complete revolution the cleaning is ordinarily complete, and the operator raises the tip 54 out of the mold by rocking the torch about the shaft 60. This rocking movement of the torch causes the oxygen and acetylene valves in the valve block 86 to close, and causes the electric switch 98 to open. The flame jets are thus automatically extinguished and the motor 25 stopped.

The latch 44 is then released and the tire mold removed from the turntable.

In the preferred embodiment of the invention the tire mold is moved with respect to a stationary torch, but the relative movement necessary can be obtained by moving the torch instead, and other changes and modifications can be made and various features of the invention used with or without other features, without departing from the invention as defined in the claims.

I claim:

1. A machine for cleaning tire molds comprising a substantially horizontal turntable for revolving a tire mold; mechanism operable to shift a tire mold on the turntable to bring the axis of the tire mold in line with the axis of the turntable and hold it in centered position; mechanism for rotating the turntable at a substantially uniform speed; a support; a torch holder carried by the support and movable with respect to the support to bring said torch holder into position to hold a torch over the tire mold with the end of the torch in position to direct diverging flame jets against the wall of the tire-receiving recess while the mold revolves with the turntable.

2. Apparatus for cleaning tire molds comprising an oxy-fuel torch; mechanism for causing relative movement of the torch and a tire mold; valves to control the supply of oxygen and fuel to the torch; a support including a torch holder movable to raise the torch from the mold or lower said torch into position to direct flame jets against the wall of the tire-receiving recess of the mold; and means for automatically closing the oxygen and fuel valves when the torch is raised from the mold.

3. Apparatus for cleaning tire molds comprising an oxy-fuel torch; mechanism for causing relative movement of the torch and a tire mold; valves to control the supply of oxygen and fuel to the torch; a torch holder movable to bring the torch into and out of position for directing flame jets against the wall of the tire-receiving recess of the mold; automatic valve-operating means for completely closing the oxygen and fuel valves to extinguish the torch as it is moved away from the tire-receiving recess, and for opening said valves as the torch is moved toward the recess; and a pilot light adjacent the path of the torch in position to ignite the gas immediately after the valves open.

4. Apparatus for cleaning tire molds comprising an oxy-fuel torch; mechanism for causing relative movement of the torch and a tire mold; valves to control the supply of oxygen and fuel to the torch; a support for the torch; means pivotally connecting the torch to the support so that the tip end of the torch moves in an arcuate path toward and from the tire-receiving recess of the mold; and cam means operated by pivotal movement of the torch for closing the valves as the tip end of the torch moves away from the tire mold and for opening the valves when said tip end of the torch moves toward the tire mold.

5. A machine for cleaning tire molds comprising a torch holder for supporting a torch in position to direct flame jets against a tire mold and movable to shift the torch into and out of said position; driving mechanism for causing relative movement between the torch holder and tire mold; and automatic control means for stopping the driving mechanism when the torch holder is moved to shift a torch away from the tire mold, and for starting the driving mechanism when the torch holder is moved to shift the torch away from the tire mold.

6. A machine for cleaning tire molds comprising a turntable for revolving a tire mold; a torch for directing oxy-fuel flame jets against the mold; means supporting the torch for movement toward and from the mold; an electric motor for revolving the turntable; and switch means operated by movement of the torch to start the motor when the torch moves toward the tire mold and stop the motor when the torch moves away from the tire mold.

7. In a machine for cleaning tire molds, driving mechanism for causing relative movement of a torch tip and tire mold; means for supporting the torch tip for movement into and out of the tire-receiving recess of the mold; and automatic control means for starting the driving mechanism as the torch tip is moved toward the tire mold.

8. In a machine for cleaning tire molds, an oxy-fuel torch for directing flame jets against the wall of the tire-receiving recess of a mold to clean said wall; means for supplying oxygen and fuel to the torch; driving mechanism for causing relative movement of the tire mold and the torch; and automatic control means for starting the driving mechanism whenever the torch is operated to clean a mold.

9. A machine for cleaning tire molds comprising a turntable for revolving a tire mold; means for centering a tire mold on the turntable and holding it in centered position; mechanism for rotating the turntable; an oxy-fuel torch; valves to control the supply of oxygen and fuel to the torch; a torch holder supporting the torch for movement toward and from the mold; and automatic valve-operating means for opening the valve when the torch is moved toward the tire mold to direct flame jets against said mold and for closing the valves when the torch is moved away from said mold.

10. Apparatus for cleaning tire molds including in combination, a turntable for revolving a tire mold; power driving mechanism for the turntable; an oxy-fuel torch for directing flame jets against the tire mold; valves for controlling the supply of oxygen and fuel to the torch; a torch holder supporting the torch for movement toward and from the tire mold; valve-operating means operated by movement of the torch for causing the valves to open as the torch moves toward the mold, and to close as the torch moves away from said mold; and control means operated by said movement of the torch for stopping the driving mechanism as the torch moves away from the mold and starting said mechanism as the torch moves toward the mold.

GEORGE L. WALKER.